Dec. 9, 1952

E. W. TAYLOR 2,620,743

RAILROAD CAR TRUCK

Filed Nov. 3, 1947

INVENTOR.
Ernest W. Taylor
BY
Frank C. Kearman
ATTORNEY

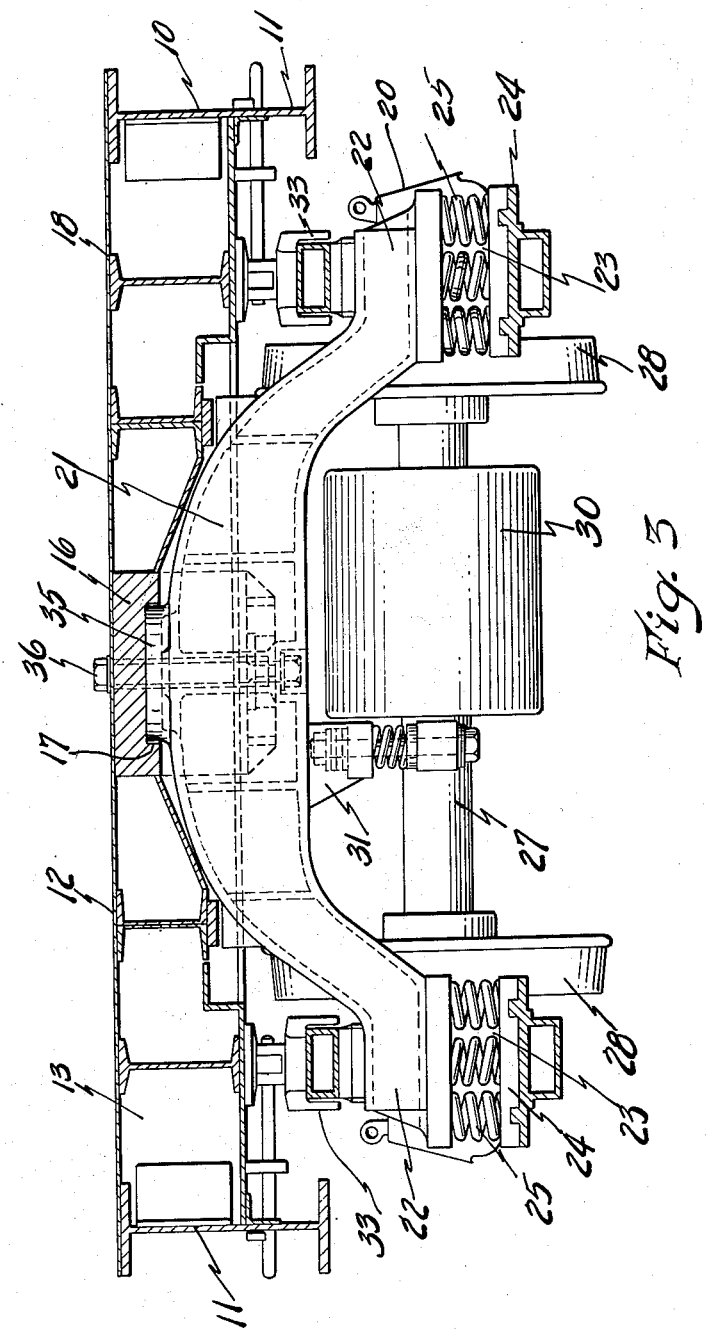

Dec. 9, 1952     E. W. TAYLOR     2,620,743
RAILROAD CAR TRUCK

Filed Nov. 3, 1947     3 Sheets-Sheet 3

INVENTOR.
Ernest W. Taylor
BY Frank C. Learman
Attorney

Patented Dec. 9, 1952

2,620,743

UNITED STATES PATENT OFFICE 2,620,743

RAILROAD CAR TRUCK

Ernest W. Taylor, Bay City, Mich., assignor to Industrial Brownhoist Corporation, Bay City, Mich.

Application November 3, 1947, Serial No. 783,637

5 Claims. (Cl. 105—199)

The present invention relates to improvements in truck traveling vehicles such as railway cars, and more particularly to truck connections between the underframe of a vehicle and the trucks therefor.

Railroad trucks as at present constructed have the drive motor mounted and suspended outside the truck frame ahead of the axles, and this type of mounting presents certain hazards on sharp curves, with the possibility of so-called rail climbing and derailing of the trucks, and with the consequent damage and property loss, and possibility of human injury, therefore:

The primary object of the present invention is to design a car truck in which the centers of the wheels can be kept relatively close together and still provide sufficient space between the axles for mounting and suspending the motor inside the truck frame so that it can be readily mounted and demounted as well as accessible for adjustment and/or repair when required.

Another object of the invention is to provide arched bolsters to accommodate the drive motors between the axles and provide for easy accessibility thereto.

Another object of the invention resides in the provision of buffer means on the underframe of the vehicle and the vehicle truck which cooperate to reduce noise and excessive vibration of the center or king pin connection between the truck and frame during acceleration and deceleration.

Another object of the invention is to provide abutments having mutual engaging cooperating surfaces adjacent the king pin connection carried by the under frame structure of the vehicle and the vehicle truck which surfaces are arranged so that slapping of the king pin or center bolt will be reduced during acceleration and deceleration while allowing free movement of the truck relative to the underframe structure to permit side sway and rocking of the truck during track traveling movement.

Another object of the invention is to provide cooperating surfaces on the underframe structure of the vehicle and the vehicle truck which are arcuately curved and are arranged in circumferentially spaced apart relation 180° so that portions of said surfaces will be in mutual engagement during sudden acceleration or deceleration of the vehicle while on straight or curved track ways.

Another object of the invention, is to provide cooperating abutments on the truck and underframe structure of a railway vehicle of the draft or propelled type which mutually coact to deaden and lessen shocks and vibrations between the center pin or king bolt assembly during sudden changes in the rate of speed or during sudden starting and stopping of the vehicle.

Another object of the invention, is to provide a vehicle underframe with a pair of abutments spaced circumferentially 180° apart and concentric with the center or king bolt assembly which are adapted to engage a pair of similar abutments on the vehicle truck during sudden starting and stopping or changes in the rate of speed to thereby limit the relative travel or loose play in said king or center bolt assembly and eliminate to a large degree excessive vibrations and shocks imposed on said center or king pin assembly during such sudden changes in the rate of vehicle speed.

Another object of the invention, is to provide mutually engageable arcuate surfaces on the underframe structure of a vehicle, and the vehicle truck arranged concentric with relation to the center or king bolt assembly whereby considerable wear will be removed from said center or king bolt structure during sudden starting and stopping of the vehicle and excessive compressional strains and stresses on the center bolt assembly will be reduced.

Another object of the invention, resides in the novel construction and arrangement of the various parts of the invention such that shocks caused by sudden changes in the rate of vehicle speed from draft or propulsion of the vehicle will be reduced and minimized, there being sets of arcuately curved mutually engageable abutments forwardly of the king or center bolt assembly, as well as rearwardly thereof.

Other objects and advantages of the invention will become apparent during the course of the following description of the accompanying drawings, wherein:

Figure 3 is a transverse vertical cross-sectional view of a railway vehicle underframe structure and truck therefor showing the various details of construction of the center bolt assembly.

Figures 1, 2:
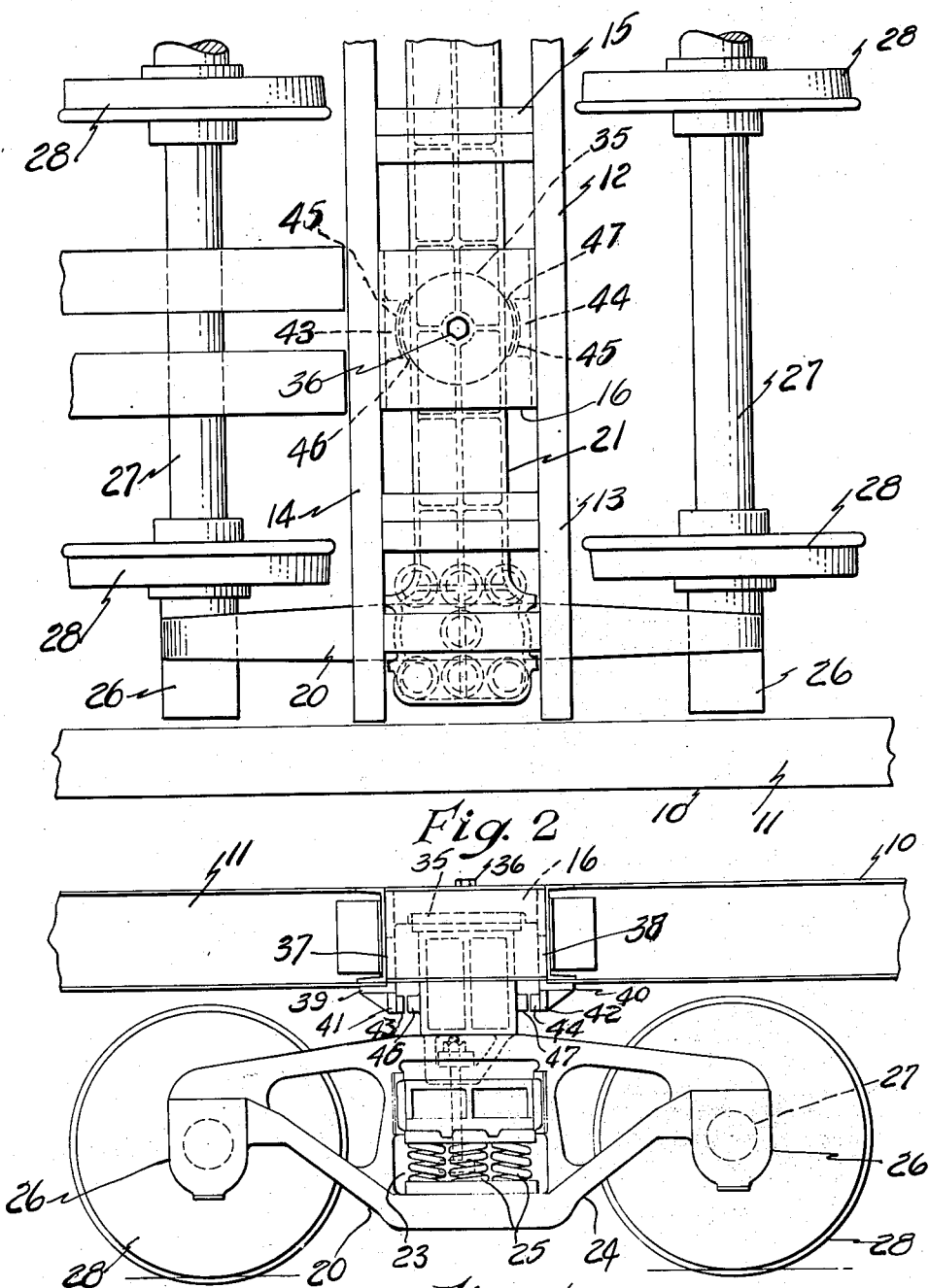
Figure 1 is a side elevational view of a railway truck and underframe structure of a rail vehicle showing the invention applied thereto.
Figure 2 is a fragmentary top elevational view of the underframe structure of a railway vehicle and truck therefor showing the positions of the abutment members on the truck and frame bolsters.
Figure 4:
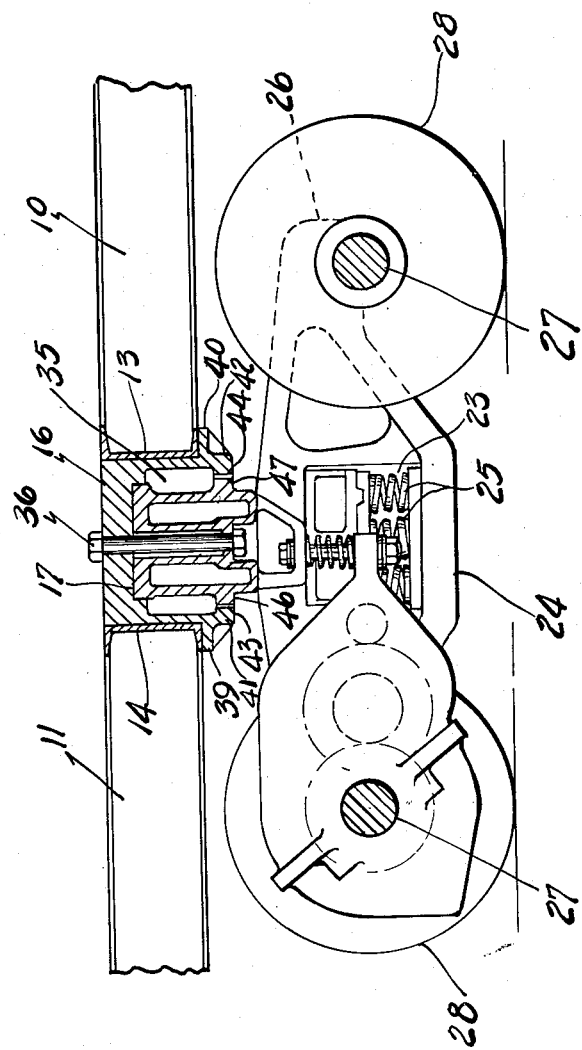
Fig. 4 is a longitudinal, sectional, elevational view of the bolster connection with the car body.

In the drawings, wherein for the purpose of illustration, there is shown a railway car underframe structure supported by a motor propelled car truck, and it is to be understood, that the invention while illustrated in connection with an electric railway car or vehicle can be employed in draft type railway cars or vehicles with equal facility.

More particularly, the drawings illustrate a railway car underframe structure 10 having side sills 11 which are connected by the usual frame bolster 12. Intermediate sill members may be provided as well as center sill members. The frame bolster 12 is formed of a pair of spaced frame members 13 and 14 which are connected by sill members 15. Mounted between the frame bolster members 13 and 14 is a center bearing filler block 16 which is fastened in place in the conventional manner. The central portion of the filler block is recessed as at 17 (Fig. 3), for receiving the bearing boss on the truck bolster which will be more fully described hereinafter. A sill plate 18 is also provided on the top of the underframe structure.

The vehicle frame structure is supported on a pair of rail traveling trucks, one of which is illustrated for the purpose of description and since both are identical in construction, a description of one will suffice for both. As shown best in Figure 3, the truck 20 comprises an arcuate bolster 21 having end portions 22 which extend through the bolster openings 23 in conventional truck side frames 24. Coil springs 25 are positioned within the bolster openings 23 and are arranged with one of their ends engaging a side frame plate, and the opposite ends positioned beneath the sliding ends of the truck bolster 21. The conventional journal boxes 26 are provided on the ends of the truck side frames 20 for receiving axles 27 having track wheels 28.

One of the axles 27 of the vehicle truck is adapted to be driven by an electric motor 30 resiliently supported by means of a bracket 31 suspended from the truck bolster 21 such that the motor casing is free to move vertically but restrained against rotative movement. The armature shaft of the motor is drivingly connected to one of said axles 27.

Side sway bearings are positioned between the vehicle truck 20 and underframe structure 10 and are generally indicated as at 33.

Mounted on or formed integral with the truck bolster 21 and extending upwardly from the upper chord thereof is a bearing projection 35 which is adapted to be received in the recess 17 of the frame bolster center or bearing filler 16. A locking king bolt or pin 36 is passed through openings in the frame bolster center or bolster filler 16 and the center of the truck bolster. It will thus be seen that the truck bolster 21 has its arcuate portion extending between the rails of the frame bolster in a manner to permit free movement about the axis of the king bolt 36.

Secured beneath the frame bolster center or bearing filler 16 is a pair of brackets 37 and 38 which are affixed to the opposed faces of the frame bolster rails 13 and 14. The lower ends of the brackets are angularly bent as at 39 and 40 respectively, and said angular portions are welded or otherwise attached to the lower flanges of the frame bolster rails 13 and 14. Depending bracket portions 41 and 42 are formed integral with the brackets 37 and 38. The opposed faces of the depending brackets 41 and 42 are each provided with abutment blocks 43 and 44 having arcuately curved concave faces 45.

It is to be noted that the abutment blocks 43 and 44 are positioned forwardly and rearwardly of the truck bolster 21 and are presented to the vertical sides thereof at a point adjacent the lower chord.

Cooperating with the abutment blocks 43 and 44 and positioned on the vertical side walls of the truck bolster 21 is a pair of abutment projections 46 and 47 arranged in opposition to the abutment blocks 43 and 44 and having arcuately curved convex faces in opposed relation to the arcuately curved concave faces on the abutment blocks. Thus, the face of the abutment block 43 is presented to the convex face of the abutment projection 46, and similarly the concave face of the abutment block 44 is presented to the abutment projection 47.

Normally, the mutually curved surfaces of the abutment blocks and projections 43—44 and 46—47 will be slightly spaced apart so that during sudden stopping and starting slight shifting movement of the truck relative to the vehicle frame will cause contactual engagement of one set of mutually curved abutment block and projection surfaces, depending of course upon the direction of the truck movement or shifting.

It will be further noted that the convexly curved surfaces of the abutment projections 46 and 47 are on an arc substantially equal to the radius of the vertical wall of the bearing projection 35 and bearing recess 17.

When the vehicle truck is shifted either forwardly or rearwardly relative to the underframe structure during sudden changes in the rate of speed such as is encountered in sudden starting and stopping, the curved faces of one set of abutments and abutment projection will engage and provide additional bearing surfaces for the center pin construction. Upon engagement of the mutually curved surfaces, shocks which would otherwise be transmitted to the king bolt 16 will be dampened with the result that vibration caused from sudden starting and stopping as well as changes in the rate of speed will be considerably reduced. Also, by reason of the fact that additional bearing surfaces are brought into operation upon such sudden starting and stopping, wear on the king bolt will be reduced and compressional stresses and strains imposed on said king bolt will be minimized.

The invention is applicable to various track traveling vehicles, including passenger and freight cars and other rail equipment such as industrial trucks for transporting freight and industrial cranes of the track traveling types.

It is to be understood, that the form of the invention herewith shown and described is to be taken as a preferred embodiment thereof, and that various changes in the shape, size and arrangement of parts may be resorted to without departing from the spirit of the invention or the scope of the subjoined claims.

I claim:
1. A center bearing structure for track vehicles, comprising a car body frame structure having a bolster, a car truck including an upwardly arched bolster disposed beneath said body frame bolster, a center bearing filler block supported by said frame bolster having a bearing recess in the lower face thereof, a bearing projection formed integral with said truck bolster received in said bearing recess, a king bolt extending through central openings in said bear- ing filler block and bearing projection for pivspaced-apart cooperating concentric buffer elements on the frame bolster and truck bolster respectively, and adapted to limit longitudinal shifting movement of said body frame relative to said car truck.

2. A center bearing structure for track vehicles, comprising a car body frame structure having a bolster, a car truck including an upwardly arched bolster disposed beneath said body frame bolster, a center bearing filler supported by said frame bolster having a bearing recess in the lower face thereof, a bearing projection formed integral with said truck bolster received in said bearing recess, a king bolt extending through central openings in said bearing filler and bearing projection for pivotally connecting said car truck to said car body frame, a pair of longitudinally disposed, diametrically spaced-apart concentric buffer elements on said car frame supported by said frame bolster, and a pair of concentrically arranged buffer elements on said truck bolster engageable with the buffer elements on said body frame structure upon a predetermined longitudinal shifting movement of said frame relative to said car truck.

3. A center bearing structure for track vehicles comprising a car body frame structure having a bolster, a car truck including an upwardly arched bolster disposed beneath said body frame bolster, a center bearing filler supported by said frame bolster having a bearing recess in the lower face thereof, a bearing projection formed integral with said truck bolster and received in said bearing recess, a king bolt extending through said bearing filler and bearing projection respectively for pivotally connecting said car truck to said car body frame, brackets on said car frame supported by said frame bolster, longitudinally spaced, concentric buffer elements mounted thereon, and a pair of buffer elements on said truck bolster engageable with the buffer elements on said body frame structure upon longitudinal shifting movement of said frame relative to said car truck, the buffer elements being located forwardly and rearwardly of said king bolt.

4. A center bearing structure comprising, a vehicle frame having a bolster provided with a center bearing filler block, a car truck for supporting said vehicle frame, including an upwardly arched bolster provided with an upwardly projecting bearing journaled in said filler block, a king bolt extending through said filler block and bearing and pivotally connecting said car truck and vehicle frame, longitudinally spaced abutment blocks on said vehicle frame, and abutment projections on said car truck concentric with said king bolt and in alignment with said abutment blocks to limit longitudinal shifting movement of said vehicle frame with relation to said truck frame.

5. A center bearing structure for track vehicles comprising, a car body frame structure having a bolster, a car truck including an upwardly arched bolster disposed beneath said body frame bolster, a center bearing filler supported by said frame bolster and formed with a circular bearing recess in the lower face thereof, a correspondingly shaped bearing projection on said truck bolster adapted to be received in said bearing recess, a king bolt extending through the central openings in said bearing filler and bearing projection for connecting said car truck to said car body frame, longitudinally spaced brackets on the body frame, abutment blocks on said brackets, abutment projections on said truck bolster and engageable with the abutment blocks on said body frame structure upon longitudinal shifting movements of said frame relative to said car truck, said buffer elements being provided with mutually curved engaging surfaces on an arc radius equal to the arc radius of the bearing recess and bearing projection respectively.

ERNEST W. TAYLOR.

REFERENCES CITED

The following references are of record in the file of this patent:

UNITED STATES PATENTS

| Number | Name | Date |
|---|---|---|
| 243,796 | Robinson | July 5, 1881 |
| 799,315 | Edwards | Sept. 12, 1905 |
| 1,006,731 | Downs | Oct. 24, 1911 |
| 1,147,210 | Coleman | July 20, 1915 |
| 1,628,262 | McGinnis | May 10, 1927 |
| 2,249,467 | Finch | July 15, 1941 |
| 2,272,426 | Nystrom | Feb. 10, 1942 |